United States Patent
Hu et al.

(10) Patent No.: US 12,537,106 B2
(45) Date of Patent: Jan. 27, 2026

(54) MOTION ESTIMATION METHOD AND APPARATUS FOR TUMOR, TERMINAL DEVICE, AND STORAGE MEDIUM

(71) Applicant: SHENZHEN INSTITUTES OF ADVANCED TECHNOLOGY CHINESE ACADEMY OF SCIENCES, Guangdong (CN)

(72) Inventors: Ying Hu, Guangdong (CN); Baoliang Zhao, Guangdong (CN); Long Lei, Guangdong (CN); Huajie Tang, Guangdong (CN)

(73) Assignee: SHENZHEN INSTITUTES OF ADVANCED TECHNOLOGY CHINESE ACADEMY OF SCIENCES, Guangdong (CN)

( * ) Notice: Subject to any disclaimer, the term of this patent is extended or adjusted under 35 U.S.C. 154(b) by 261 days.

(21) Appl. No.: 18/366,704

(22) Filed: Aug. 8, 2023

(65) Prior Publication Data
US 2023/0377758 A1 Nov. 23, 2023

Related U.S. Application Data

(63) Continuation of application No. PCT/CN2021/138010, filed on Dec. 14, 2021.

(30) Foreign Application Priority Data

Apr. 20, 2021 (CN) .......................... 202110424937.1

(51) Int. Cl.
*G06Q 10/00* (2023.01)
*G06T 7/00* (2017.01)
(Continued)

(52) U.S. Cl.
CPC ........... *G16H 50/50* (2018.01); *G06T 7/0012* (2013.01); *G06T 7/246* (2017.01); *G06T 7/73* (2017.01);
(Continued)

(58) Field of Classification Search
CPC ........... G16H 50/50; G06T 7/246; G06T 7/73; G06T 7/0012
See application file for complete search history.

(56) References Cited

U.S. PATENT DOCUMENTS

| | | | |
|---|---|---|---|
| 2010/0198101 A1 | 8/2010 | Song et al. | |
| 2012/0201428 A1 | 8/2012 | Joshi et al. | |
| 2014/0046172 A1 | 2/2014 | Kim et al. | |

FOREIGN PATENT DOCUMENTS

| | | |
|---|---|---|
| CN | 101623198 A | 1/2010 |
| CN | 101972515 A | 2/2011 |

(Continued)

OTHER PUBLICATIONS

International Search Report dated Mar. 3, 2022 in International Application No. PCT/CN2021/138010. English translation attached.
(Continued)

*Primary Examiner* — Rajesh Khattar

(57) ABSTRACT

The present disclosure relates to the technical field of image processing and provides a motion estimation method and apparatus for a tumor, a terminal device, and a storage medium. The method includes: obtaining a current value of a respiratory correlation signal of a patient, the respiratory correlation signal reflecting a motion trajectory feature of a designated organ with the tumor of the patient in each of different respiratory states; inputting the current value of the respiratory correlation signal into a tumor motion estimation model to obtain an estimated current position of the tumor; and inputting the estimated current position of the tumor into an organ motion estimation model to obtain an estimated (Continued)

current velocity vector field of the designated organ. By adopting the motion estimation method, it realizes a respiratory motion estimation for the whole organ and enhance accuracy of positioning the tumor and vital anatomical structures around the tumor.

18 Claims, 3 Drawing Sheets

(51) Int. Cl.
 G06T 7/246 (2017.01)
 G06T 7/73 (2017.01)
 G16H 50/50 (2018.01)

(52) U.S. Cl.
 CPC ............ G06T 2207/20081 (2013.01); G06T 2207/30096 (2013.01); G06T 2207/30204 (2013.01); G06T 2207/30241 (2013.01)

(56) References Cited

FOREIGN PATENT DOCUMENTS

| CN | 103761745 A | 4/2014 |
| CN | 104268895 A | 1/2015 |
| CN | 106563210 A | 4/2017 |
| CN | 110473440 A | 11/2019 |
| CN | 111161333 A | 5/2020 |
| CN | 113112486 A | 7/2021 |

OTHER PUBLICATIONS

First Office Action from corresponding Chinese Application No. 202110424937.1, dated Apr. 29, 2022. English translation attached.
The Grant Notice from corresponding Chinese Application No. 202110424937.1, dated Nov. 4, 2022. English translation attached.
Yu, Yonghua et al. "Establishment of a Mathematical Model for the Influence of Respiratory Movement upon the Position of an Intrahepatic Space-occupying Lesion" Chinese Journal of Radiation Oncology, vol. 11, No. 04, Dec. 25, 2002 (Dec. 25, 2002).
Shao, Yunwen et al. "A Study on the Influence of Respiratory MC on Liver Kinetic Analysis Based on PET Dynamic Imaging" China Medical Equipment, 2020, 17(11):8-13.

MOTION ESTIMATION METHOD AND APPARATUS FOR TUMOR, TERMINAL DEVICE, AND STORAGE MEDIUM

CROSS-REFERENCE TO RELATED APPLICATIONS

This application is a continuation of international Application No. PCT/CN2021/138010 filed on Dec. 14, 2021, which claims a priority to Chinese Application No. CN202110424937.1 filed on Apr. 20, 2021, the entire disclosure of which is incorporated herein by reference.

FIELD

The present disclosure relates to the technical field of image processing, and more particularly, to a motion estimation method and apparatus for a tumor, a terminal device, and a storage medium.

BACKGROUND

One of common means for cancer diagnosis and treatment is using a percutaneous medical image to guide an interventional operation. However, in practice, the difficulty of precisely inserting a puncture needle into a tumor position without damaging vital structures such as blood vessels around the tumor is increased by motion of a tumor and an organ caused by a patient's physiological respiration.

For the above problems, respiratory motion of a target is estimated in real time typically by establishing a respiratory motion model in the related art. According to this method, a correlation model between an easily available proxy signal and internal target motion is established mainly by using a strong correlation between the easily available proxy signal and the internal target motion, and the target motion is estimated by detecting the proxy signal in real time during operation. However, due to modeling complexity, this method generally can only simulate respiratory motion of the tumor or a single anatomical feature point, and is not applicable to a whole organ, which cannot achieve accurate positioning of the tumor and its surrounding vital anatomical structures.

SUMMARY

In view of this, an embodiment of the present disclosure provides a motion estimation method and apparatus for a tumor, a terminal device, and a storage medium, capable of estimating respiratory motion of an organ in which the tumor is located in real time and improving accuracy of positioning the tumor and vital anatomical structures around the tumor.

In a first aspect according to an embodiment of the present disclosure, a motion estimation method for a tumor is provided. The method includes: obtaining a current value of a respiratory correlation signal of a patient, wherein the respiratory correlation signal reflects a motion trajectory feature of a designated organ with the tumor of the patient in each of different respiratory states; inputting the current value of the respiratory correlation signal into a tumor motion estimation model to obtain an estimated current position of the tumor, the tumor motion estimation model being constructed by using a priori-tumor position data set and the respiratory correlation signal as priori knowledge, the priori-tumor position data set being determined based on a pre-collected image data set of the designated organ and including a position of the tumor in each of different respiratory states, and the image data set including a three-dimensional image of the designated organ in each of different respiratory states; and inputting the estimated current position of the tumor into an organ motion estimation model to obtain an estimated current velocity vector field of the designated organ, the current velocity vector field including a velocity vector corresponding to each position point of the designated organ, the organ motion estimation model being constructed by using a priori velocity vector field and the priori-tumor position data set as the priori knowledge, and the prior velocity vector field being determined based on the image data set and including a velocity vector field of the designated organ in each of different respiratory states.

According to an embodiment of the present disclosure, provided is a hierarchical estimation architecture for motion from the tumor to the whole organ under free respiratory motion. The architecture includes the tumor motion estimation model and the organ motion estimation model. The tumor motion estimation model is constructed by using the priori-tumor position data set and the respiratory correlation signal as the priori knowledge. The organ motion estimation model is constructed by using the priori velocity vector field and the priori-tumor position data set as the priori knowledge. In a process of performing an operation on a patient having the tumor, an estimated tumor position is obtained first by inputting a respiratory correlation signal of the patient as a proxy signal into the tumor motion estimation model; then, an estimated velocity vector field of the whole organ is obtained by inputting the estimated tumor position into the organ motion estimation model. Therefore, it is possible to estimate the respiratory motion of the whole organ and improve the accuracy of positioning the tumor and the vital anatomical structures around the tumor.

In an embodiment of the present disclosure, the respiratory correlation signal is a motion trajectory signal of an optical marker disposed at a specified part of a body of the patient. The motion trajectory signal includes a spatial position of the optical marker at each time point. The method further includes, prior to the inputting the current value of the respiratory correlation signal into the tumor motion estimation model: constructing a position pairing data set based on the priori-tumor position data set and the motion trajectory signal, the position pairing data set including a tumor position in the priori-tumor position data set and an optical marker position in the motion trajectory signal that respectively correspond to each of the respiratory states; and constructing the tumor motion estimation model by using the position pairing data set as the priori knowledge.

Further, the constructing the tumor motion estimation model by using the position pairing data set as the priori knowledge includes: establishing a corresponding tumor motion estimation model in each predetermined space coordinate direction by using the motion trajectory signal as a proxy signal based on a s-SVR machine learning model and the position pairing data set.

In an embodiment of the present disclosure, the method further includes, prior to the inputting the current value of the respiratory correlation signal into the tumor motion estimation model: obtaining body data of the designated organ in each of different respiratory states by dividing the image data set; selecting one of respiratory states from the different respiratory states as a reference state, and performing diffeomorphic deformation-registration processing on body data in the reference state and body data in other states to obtain the priori velocity vector field, the other states being other respiratory states except the reference state among the different respiratory states; and constructing the organ motion estimation model by using the priori velocity vector field and the priori-tumor position data set as the priori knowledge.

Further, the performing the diffeomorphic deformation-registration processing on the body data in the reference state and the body data in the other states to obtain the priori velocity vector field includes: assigning a predetermined initial value to a velocity vector field of the designated organ in the reference state; and calculating, for each of the respiratory, states in the other states, an update value of a velocity vector field corresponding to the respiratory state by using an alternately optimized strategy based on body data in the respiratory state and the body data in the reference state, and adding the update value to the initial value to obtain a velocity vector field of the designated organ in the respiratory state.

In an embodiment of the present disclosure, the inputting the estimated current position of the tumor into the organ motion estimation model to obtain the estimated current velocity vector field of the designated organ includes: obtaining, for each position point of the designated organ, an estimated current velocity vector of the position point by using a velocity vector of the position point as a function of the estimated current position of the tumor and performing an interpolation between velocity vectors of the position point in each of the different respiratory states by means of spatial interpolation based on the estimated current position of the tumor. The velocity vector of the position point in each of the different respiratory states is determined based on the priori velocity vector field.

In an embodiment of the present disclosure, the method further includes, subsequent to the obtaining the estimated current velocity vector field of the designated organ: performing regularization on the current velocity vector field by using a predetermined Gaussian kernel function, and obtaining a current dense displacement field of the designated organ by means of group exponential transformation. The current dense displacement field includes a current displacement vector corresponding to each position point of the designated organ.

In a second aspect according to an embodiment of the present disclosure, a motion estimation apparatus for a tumor is provided. The apparatus includes a respiratory correlation signal obtaining module, a tumor motion estimation module, and an organ motion estimation module. The respiratory correlation signal obtaining module is configured to obtain a current value of a respiratory correlation signal of a patient. The respiratory correlation signal reflects a motion trajectory feature of a designated organ with the tumor of the patient in each of different respiratory states. The tumor motion estimation module is configured to input the current value of the respiratory correlation signal into a tumor motion estimation model to obtain an estimated current position of the tumor. The tumor motion estimation model is constructed by taking a priori-tumor position data set and the respiratory correlation signal as priori knowledge. The priori-tumor position data set is determined based on a pre-collected image data set of the designated organ and includes a position of the tumor in each of different respiratory states, and the image data set includes a three-dimensional image of the designated organ in each of different respiratory states. The organ motion estimation module is configured to input the estimated current position of the tumor into an organ motion estimation model to obtain an estimated current velocity vector field of the designated organ. The current velocity vector field includes a velocity vector corresponding to each position point of the designated organ. The organ motion estimation model is constructed by using a priori velocity vector field and the priori-tumor position data set as the priori knowledge, and the priori velocity vector field is determined based on the image data set and includes a velocity vector field of the designated organ in each of different respiratory states.

In a third aspect according to an embodiment of the present disclosure, a terminal device is provided. The terminal device includes a memory, a processor, and a computer program stored in the memory and executable on the processor. The processor, when executing the computer program, implements the motion estimation method for the tumor in the first aspect according to an embodiment of the present disclosure.

In a fourth aspect according to an embodiment of the present disclosure, a computer-readable storage medium is provided. The computer-readable storage medium has a computer program stored thereon. The computer program, when executed by the processor, implements the motion estimation method for the tumor in the first aspect according to an embodiment of the present disclosure.

In a fifth aspect according to an embodiment of the present disclosure, a computer program product is provided. The computer program product, when executed on a terminal device, causes the terminal device to implement the motion estimation method for the tumor in the first aspect according to an embodiment of the present disclosure.

It can be understood that beneficial effects of the above second aspect to the fifth aspect may refer to the related descriptions in the first aspect, and details thereof will be omitted herein.

BRIEF DESCRIPTION OF THE DRAWINGS

In order to clearly explain technical solutions of the embodiments of the present disclosure, drawings used in the description of the embodiments or the related art are briefly described below. Obviously, the drawings as described below are merely some embodiments of the present disclosure. Based on these drawings, other drawings can be obtained by those skilled in the art without inventive effort.

DETAILED DESCRIPTION

In the following description, for purposes of illustration rather than limitation, specific details such as specific system structures and technologies are presented to provide a thorough understanding of embodiments of the present disclosure. However, it should be apparent to those skilled in the art that the present disclosure may also be implemented in other embodiments without these specific details. In other instances, detailed descriptions of well-known systems, apparatuses, circuits, and methods are omitted so as not to unnecessarily obscure the description of the present disclosure. In addition, in the description of specification and the appended claims in the present disclosure, the terms "first", "second", "third", etc., are only used for distinguishing description, and cannot be understood as indicating or implying relative importance.

The present disclosure provides a motion estimation method and apparatus for a tumor, a terminal device, and a storage medium, capable of estimating respiratory motion of an organ in which the tumor is located in real time and improving accuracy of positioning the tumor and vital anatomical structures around the tumor. It should be understood that an execution entity of each of method embodiments of the present disclosure is various types of terminal devices or servers, such as a mobile phone, a tablet computer, a notebook computer, a desktop computer, a wearable device, and all kinds of medical devices.

Figure 1:
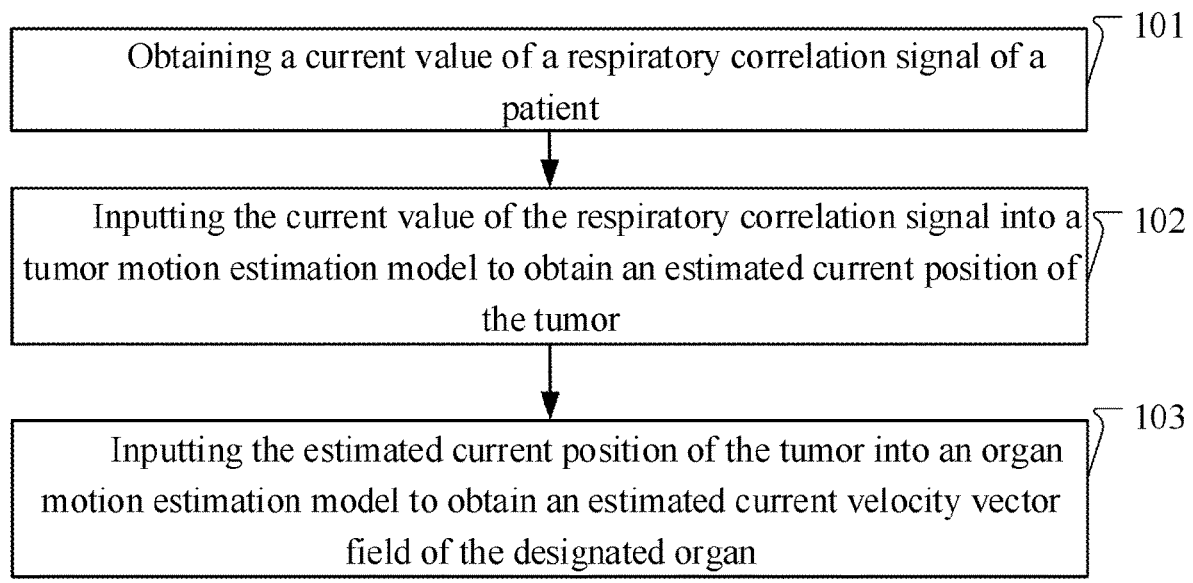
FIG. 1 is a flowchart of a motion estimation method for a tumor according to an embodiment of the present disclosure.

FIG. 1 shows a motion estimation method for a tumor according to an embodiment of the present disclosure. As illustrated in FIG. 1, the method includes the following step.

At step 101, a current value of a respiratory correlation signal of a patient is obtained.

According to an embodiment of the present disclosure, the patient is a sufferer or an animal with a tumor in an intracorporeal designated organ (such as liver, lung, or stomach). The respiratory correlation signal is any easily measurable signal capable of distinguishing difference between interperiod respiratory motion and intraperiod respiratory motion, and reflects a motion trajectory feature of a designated organ with the tumor of the patient in each of different respiratory states. For example, an optical marker may be attached to a patient's thoracoabdominal body surface. In a process of respiratory motion of the patient, a motion trajectory of the optical marker is collected as the respiratory correlation signal by using an optical tracking capture device. In this case, the current value of the respiratory correlation signal is a spatial position where the optical marker is currently located. Meanwhile, the terminal device performing the method embodiments obtains the respiratory correlation signal in real time by docking with the optical tracking capture device.

At step 102, the current value of the respiratory correlation signal is inputted into a tumor motion estimation model to obtain an estimated current position of the tumor.

After the current value of the respiratory correlation signal is obtained, the estimated current position of the patient's tumor is obtained by inputting the current value of the respiratory correlation signal into a pre-constructed tumor motion estimation model. The tumor motion estimation model is constructed by using a priori-tumor position data set and the respiratory correlation signal as priori knowledge. The priori-tumor position data set is determined based on a pre-collected image data set of the designated organ and includes a position of the tumor in each of different respiratory states. The image data set includes a three-dimensional image of the designated organ in each of different respiratory states. A construction process of the tumor motion estimation model is explained below.

In an embodiment of the present disclosure, the respiratory correlation signal is a motion trajectory signal of an optical marker disposed at a specified part of a body of the patient. The motion trajectory signal includes a spatial position of the optical marker at each time point. The method further includes the following steps, prior to inputting the current value of the respiratory correlation signal into the tumor motion estimation model.

(1) A position pairing data set is constructed based on the priori-tumor position data set and the motion trajectory signal. The position pairing data set includes a tumor position in the priori-tumor position data set and an optical marker position in the motion trajectory signal that respectively correspond to each of the respiratory states.

(2) The tumor motion estimation model is constructed by using the position pairing data set as the priori knowledge.

The tumor motion estimation model is a machine learning model that is pre-constructed by using the priori-tumor position data set and the respiratory correlation signal as the priori knowledge. The priori knowledge refers to the obtained data for establishing the machine learning model. In particular, one or more optical markers may be fixed at a specified part of a body of the patient (that may be determined based on a position of the organ with the tumor in the body of the patient, generally the skin surface of the chest and abdomen part) in a manner like pasting. Before an operation is performed on the patient, the motion trajectory signal of the optical marker is collected as the respiratory correlation signal by using an optical tracking system, which may be recorded as $\{M(t)|M(t)\in\mathbb{R}^3, t\in[-T,0]\}$ where $M(t)$ represents a spatial position of an optical marker recorded by the optical tracking system at moment t, and T represents a data collection time length. Obviously, each optical marker has a corresponding motion trajectory signal, and only one motion trajectory signal of the optical marker is required to be used when the present disclosure is implemented. The advantage of providing a plurality of optical markers is that a final result with a minimum error may be selected from these corresponding tumor motion estimation results in the subsequent process when one tumor motion estimation result is obtained corresponding to each optical marker.

The priori-tumor position data set is a data set recording the tumor position that is determined based on the pre-collected image data set of the designated organ. The image data set may be a CT image data set or an ultrasonic image data set and includes the three-dimensional image of the designated organ in each of different respiratory states. For example, before the operation is performed on the patient, a four-dimensional CT scanner may be used to obtain $N_s$ pieces of three-dimensional CT body data in patient's chest and abdomen in a free respiratory process, i.e., the four-dimensional CT body data is obtained as the image data set, where $N_s$ represents a number of respiratory states (that may be set according to a respiratory cycle and phase of the patient, for example, may have a value of 16). Different pieces of CT body data originate from different respiratory cycles and phases. After the image data set is obtained, the priori-tumor position data set may be determined based on the image data set. In some embodiments, the position of the tumor may be marked in each piece of body data of the image data set in a manual marking or automatic recognition manner. In this way, it is possible to abstract the position of the tumor corresponding to each piece of body data from the image data set. Since each piece of body data corresponds to a different respiratory state, the abstracted positions of the tumor are in one-to-one correspondence with the respiratory states. Therefore, the priori-tumor position data set may be recorded as $\{T_j|T_j\in\mathbb{R}^3; j=1,\ldots,N_s\}$, where $T_j$ represents a position of the tumor corresponding to any respiratory state j in an image coordinate system. As the body data in the $N_s$ respiratory states are obtained in total before the operation, the priori-tumor position data set also includes $N_s$ pieces of tumor position data.

After the priori-tumor position data set is determined, the position pairing data set is constructed by performing phase matching on the priori-tumor position data set and the motion trajectory signal, and the position pairing data set includes the tumor position in the prior-tumor position data set and the optical marker position in the motion trajectory signal that respectively correspond to each of the respiratory states. When the image data set is collected, the motion trajectory signal of the optical marker is collected using the optical tracking system. Each piece of body data in the image data set has a corresponding collection timestamp, and the motion trajectory signal also has a corresponding collection timestamp when being collected. Moreover, each of the tumor positions in the priori-tumor position data set is abstracted from each piece of body data of the image data set. In this case, the corresponding tumor position and optical marker position in the same respiratory state may be obtained simply by pairing the timestamp of the motion trajectory signal with the timestamp of the body data. Therefore, the position pairing data set may be expressed as $\{\{M(t_j),T_j\}|j=1,\ldots,N_s\}$, where $M(t_j)$ represents an optical marker position corresponding to the respiratory state j in the motion trajectory signal, and $T_j$ represents a tumor position corresponding to the respiratory state j in the priori-tumor position data set. Provided are a total of $N_s$ respiratory states, i.e., the position pairing data set includes $N_s$ pieces of data for pairing the optical marking position with the tumor position.

After the position pairing data set is constructed, the corresponding tumor motion estimation model may be constructed by using the position pairing data set as the priori knowledge.

Further, the step of constructing the tumor motion estimation model by using the position pairing data set as the priori knowledge includes: establishing a corresponding tumor motion estimation model in each predetermined space coordinate direction by using the motion trajectory signal as a proxy signal based on a ε-SVR machine learning model and the position pairing data set.

In actual operation, the tumor motion estimation model is established, with taking the motion trajectory signal as the proxy signal, in each space coordinate direction based on the ε-SVR machine learning model and the position pairing data set. For example, when three space coordinate directions are provided, corresponding tumor motion estimation sub-models are established in each of the three coordinate directions, i.e., three tumor motion estimation sub-models are obtained. The tumor motion estimation model in this embodiment of the present disclosure may be composed of the three tumor motion estimation sub-models, and the three tumor motion estimation sub-models are used for estimating the tumor motion component in each of different space coordinate directions, respectively. In addition, for a specific manner of constructing the machine learning model based on the ε-SVR, reference may be made to the prior art, and details thereof will be omitted herein.

The process of constructing the tumor motion estimation model is described above. In general, the construction of the tumor motion estimation model is completed before the operation is performed on the patient. During operation, the estimated current position of the tumor, which may be recorded as $\hat{T}(t)$, may be obtained by inputting the current value of the respiratory correlation signal obtained in real time into the tumor motion estimation model.

Assuming that the respiratory correlation signal is the motion trajectory signal of the optical marker, a current value of the motion trajectory signal, i.e., a current position of the optical marker, is used as an input to the tumor motion estimation model. In some embodiments, the input of the model may further include a respiratory direction. Assuming that the current position of the optical marker is $M(t_j)$, and that the current respiratory direction is $D(t_j)$, an input feature vector of the model may be expressed as $Y_j=(M(t_j)^T,D(t_j))^T \in \mathbb{R}^4$, where y represents a coordinate value of a tumor $T_j$ in a coordinate direction. A data set $\{\{Y_j,y_j\}|j=1,\ldots,N_s\}$ may be constructed to train the model to obtain model parameters. $D(t_j)$ has an expression as described below.

$$D(t_j) = \begin{cases} -1 & \text{if } \tilde{M}(t_j) - \tilde{M}(t_j - \Delta t) < -\delta \\ 0 & \text{if } -\delta \leq \tilde{M}(t_j) - \tilde{M}(t_j - \Delta t) \leq \delta, \\ 1 & \text{if } \tilde{M}(t_j) - \tilde{M}(t_j - \Delta t) > \delta \end{cases}$$

where $\tilde{M}(t_j)$ represents main motion component of a fiducial marker at moment $t_j$; $\Delta t$ represents a time interval sampled by the optical tracking system, which is determined by a sampling frequency; and δ represents a discrimination threshold, which may have a value determined based on the actual collected motion trajectory signal features of the optical marker. δ play a role in distinguishing different respiratory states such as an expiratory phase, an inspiratory phase, an expiratory end, and an inspiratory end, and has a specific value determined based on an actual respiratory motion signal of the patient, like 0.05.

At step 103, the estimated current position of the tumor is inputted into an organ motion estimation model to obtain an estimated current velocity vector field of the designated organ.

After the estimated current position of the tumor is obtained through the tumor motion estimation model, the current position is inputted into a pre-constructed organ motion estimation model that is used for a motion estimation of the whole organ with the tumor of the patient. The estimated current velocity vector field of the designated organ may be obtained through the organ motion estimation model. The current velocity vector field includes a velocity vector corresponding to each position point of the designated organ.

A method for constructing the organ motion estimation model is illustrated below. The organ motion estimation model is constructed by using a priori velocity vector field and the priori-tumor position data set as the priori knowledge. The priori velocity vector field may be determined based on the image data set as described above and includes a velocity vector field of the designated organ in each of different respiratory states.

In an embodiment of the present disclosure, the method further includes the following steps, prior to the step of inputting the current value of the respiratory correlation signal into the tumor motion estimation model.

(1) Body data of the designated organ in each of different respiratory states is obtained by dividing the image data set.

(2) One respiratory state from the different respiratory states is selected as a reference state, and diffeomorphic deformation-registration processing is performed on body data in the reference state and body data in other states to obtain the priori velocity vector field. The other states are other respiratory states except the reference state among the different respiratory states.

(3) The organ motion estimation model is constructed by using the priori velocity vector field and the priori-tumor position data set as the priori knowledge.

The body data of the designated organ in each of different respiratory states is obtained by dividing the image data set. For example, body data of the liver in each of different respiratory states is obtained by dividing the image data set.

The obtained body data may be expressed as $\{I_j:\Omega\to\mathbb{R}|j=1,\ldots,N_s\}$, where $\Omega$ represents an organ region, and $N_s$ represents the number of respiratory states. The expression represents a mapping of pixel positions in the organ region to pixel values of a real space. Furthermore, one respiratory state is selected from the $N_s$ respiratory states as the reference state and has corresponding body data that may be referred to as reference body data and expressed as $I_0 \in \{I_j|j=1,\ldots,N_s\}$. The diffeomorphic deformation-registration processing is performed on the reference body data and body data in other respiratory states (i.e., other respiratory states except the reference state among the $N_s$ respiratory states), so that a dense displacement vector field of other respiratory states relative to the reference state and a corresponding velocity vector field in a Lie algebra space (i.e., the priori velocity vector field in the present disclosure), thereby describing patient-distinctive respiratory motion priori knowledge. The dense displacement vector field may be expressed as $\{d_j:\Omega\to\mathbb{R}^3|\Omega\subset\mathbb{R}^3; j=1,\ldots,N_s\}$, which is essentially displacement of each position point in the designated organ from the reference state to each of other respiratory states, i.e., a vector field composed of displacement vectors of a large number of points. The priori velocity vector field may be expressed as $\{v_j:\Omega\to\mathbb{R}^3|\Omega\subset\mathbb{R}^3; j=1,\ldots,N_s\}$ and includes the velocity vector field of the designated organ in each of different respiratory states. The velocity vector field and the dense displacement vector field may be mutually converted by means of group exponential mapping. Consequently, the organ motion estimation model is constructed by using the priori velocity vector field and the priori-tumor position data set as the priori knowledge. For example, a data set of $\{\{T_j, v_j\}|j=1,\ldots,N_s\}$ may be constructed, where $T_j$ represents the tumor position, $v_j$ represents the priori velocity vector field. The organ motion estimation model is established based on the data set.

In some embodiments, the step of performing the diffeomorphic deformation-registration processing on the body data in the reference state and the body data in the other states to obtain the priori velocity vector field includes the following step.

(1) A predetermined initial value is assigned to a velocity vector field of the designated organ in the reference state.

(2) For each respiratory state in the other states, an update value of a velocity vector field corresponding to the respiratory state is calculated by using an alternately optimized strategy based on body data in the respiratory state and the body data in the reference state, and the update value is added to the initial value to obtain a velocity vector field of the designated organ in the respiratory state.

An initial value is assigned to the velocity vector field of the designated organ in the reference state. For example, a value of 0 may be assigned to the velocity vector field (i.e., an initial velocity vector of each position point in the organ is 0 and is initially in a stationary state). In addition, for each respiratory state in the other states, the update value of the velocity vector field corresponding to the respiratory state is calculated by using the alternately optimized strategy based on the body data in the respiratory state and the body data in the reference state, and the update value is added to the initial value to obtain a velocity vector field corresponding to the respiratory state. In the same way, the velocity vector field corresponding to each respiratory state among the other states may be obtained.

For example, two pieces of body data $I_0$ (the body data in the reference state) and body data $I_j$ (the body data in any of the other states) are given. In this way, a Demons alternately optimized strategy is used, and an update value u of a velocity vector field is obtained by optimizing the formula below in the Lie algebra space on the basis of a current transformation of $d_j=\exp(v_j)$, thereby updating the current transformation by $v_j\leftarrow v_j=u$, i.e., updating the $v_j$ using u. The formula is described below.

$$E_{d_j}(I_0, I_j, u) = \|I_0 - I_j \circ (Id + d_j \circ \exp(u))\|_2^2 + \frac{\sigma_i}{\sigma_x}\|u\|_2^2,$$

where $d_j$ represents a displacement vector field corresponding to any of the other states, $v_j$ represents a velocity vector field corresponding to any of the other states, $E_{d_j}$ represents an energy function corresponding to the displacement vector field $d_j$, Id is a consistency transformation of the body data $I_0$, a double vertical line in the formula represents an L2 norm, $\sigma_i$ represents an image similarity weight, $\sigma_x$ represents a spatial uncertainty weight of the transformation, and a symbol o represents that the transformation is applied to the image.

Then, regularization is realized by performing a convolution operation on the transformation and a Gaussian kernel, which may obtain the velocity vector field in the Lie algebra space corresponding to any of the other states. Furthermore, a corresponding diffeomorphic dense displacement vector field of $d_j=\exp(v_j)$ may be obtained after the velocity vector field is subjected to group exponential mapping transformation.

In an embodiment of the present disclosure, the step of inputting the estimated current position of the tumor into the organ motion estimation model to obtain the estimated current velocity vector field of the designated organ includes: obtaining, for each position point of the designated organ, an estimated current velocity vector of the position point by using a velocity vector of the position point as a function of the estimated current position of the tumor and performing an interpolation between velocity vectors of the position point in each of the different respiratory states by means of spatial interpolation based on the estimated current position of the tumor. The velocity vector of the position point in each of the different respiratory states is determined based on the priori velocity vector field.

On the basis of obtaining a log-domain priori velocity vector field $\{v_j:\Omega\to\mathbb{R}^3|j=1,\ldots,N_s\}$, the priori-tumor position data set $\{T_j|T_j\in\mathbb{R}^3; j=1,\ldots,N_s\}$ and the estimated current position $\hat{T}(t)$ of the tumor, the velocity vector at any position point in the designated organ may be obtained by using a velocity vector at any position point (an anatomical point) in the designated organ as a function of the tumor position in the same respiratory state (at the current moment) and performing an interpolation between the velocity vectors of the position point obtained before the operation in different respiratory states.

In some embodiments, since the Lie algebra space has bilinear features, a diffeomorphic deformation field may be finally ensured to be obtained by performing an interpolation between the velocity vectors in the Lie algebra space. When the interpolation is performed, any spatial interpolation method may be used. As an example, a Kriging interpolation method is able to take into account not only a positional relationship between an estimated point and an observation point, but also a positional relationship between the observation points, thus achieving an optimal unbiased estimation for a target velocity vector and acquiring a desired interpolation result when few observation points are provided.

Since the respiratory movement of organs such as the liver has anisotropy, in the present disclosure, the component of the velocity vector in each of the three coordinate directions of the Lie algebra space is estimated, respectively. Assuming that z is a coordinate value of the velocity vector of any anatomical point of the specified organ after being subjected to standardization (which may specifically be a normal operation in data processing, such as an operation of subtracting a mean value from an original value and then dividing the result by a standard deviation into the value after the subtracting), i.e., a value of the z needs to be estimated. $\tilde{T}=(y_1, y_2, y_3)$ is a tumor position (i.e., the estimated current position of the tumor as described previously) in the same respiratory state after standardization, and z is viewed as a combination of a regression model F and a random process e, i.e., $z(\tilde{T})=F(\tilde{T})+e(\tilde{T})$, where e is used for describing an approximation error. To simplify the calculation, the regression model F may be taken by a constant of $\beta$. In addition, it may assume that the random process e may have a mean value of 0 and a covariance of $E[e(\tilde{T}_p) e(\tilde{T}_q)] = \sigma^2 R(\tilde{T}_p, \tilde{T}_q)$, where $\sigma^2$ is a process variance, and $R(\tilde{T}_p, \tilde{T}_q)$ is a model describing a correlation between variables z at corresponding tumor positions in any two of respiratory states among the $N_s$ respiratory states. The model reflects both a spatial structure characteristic and a random distribution characteristic of the variable z and has specific parameters that may be obtained by fitting, such as least squares method, on a observation data set before operation.

An estimation of z may be obtained through a weighted sum of the observation values before operation (i.e., the velocity vector of the position point in each of different respiratory states determined based on the priori velocity vector field) on the basis of performing real-time estimation on the tumor position. For example, the estimation of z may be obtained according to:

$$z = c^T Z,$$

where $Z=[z_1, \ldots, z_{N_s}]^T$ represents the coordinate value of the velocity vector of the position point corresponding to each of the $N_s$ respiratory states before operation, and $c=[c_1, \ldots, c_{N_s}]^T$ represents a weight coefficient vector that satisfies the unbiased estimation and minimizes the mean square error.

By deriving the formula $z=c^T Z$, a set of formulas as described below may be obtained.

$$z = a + r^T(Z - aF), \text{ and}$$

$$a = (F^T R^{-1} F)^{-1} F^T R^{-1} Z,$$

where F is a column vector with all elements being 1, $R=[R(\tilde{T}_p, \tilde{T}_q)]_{N_s \times N_s}$ is an incidence matrix of the variable z in the $N_s$ respiratory states obtained before operation, and $r=[R(\tilde{T}_p, \tilde{T})]_{N_s \times 1}$ is an incident vector of the real-time estimated tumor position and the variable z in the $N_s$ respiratory states obtained before operation. In the set of formulas, all the quantities except the incident vector r may be determined before operation. The incident vector r may be calculated based on the real-time estimated tumor position obtained in operation. Therefore, the z may be calculated using the set of formulas to complete the estimation of the target.

In addition, an estimation of coordinate values x and y of the velocity vector of any anatomical point in other coordinate directions may be implemented with reference to the above-mentioned method for estimating the z, thus obtaining the current velocity vector (x, y, z) of any anatomical point. Similarly, a current velocity vector corresponding to each anatomical point of the designated organ may be estimated by using same manner, thereby obtaining the current velocity vector field of the designated organ, i.e., obtaining the current velocity vector corresponding to each anatomical point of the designated organ.

In an embodiment of the present disclosure, the method further includes, subsequent to the step of obtaining the estimated current velocity vector field of the designated organ: performing regularization on the current velocity vector field by using a predetermined Gaussian kernel function and obtaining a current dense displacement field of the designated organ by means of group exponential transformation. The current dense displacement field includes a current displacement vector corresponding to each position point of the designated organ.

To ensure smoothness of a final transformation, the regularization is performed on the current velocity vector field using the predetermined Gaussian kernel function on the basis of obtaining the current velocity vector field of the whole organ, then the final estimation of the dense deformation displacement vector field relative to the reference state is obtained by means of group exponential transformation, and reconstruction of organ motion morphology in a new respiratory state may be finally realized based on the dense deformation displacement vector field.

According to an embodiment of the present disclosure, provided is the hierarchical estimation architecture for the motion from the tumor to the whole organ under the free respiratory motion. The architecture includes the tumor motion estimation model and the organ motion estimation model. The tumor motion estimation model is constructed by using the priori-tumor position data set and the respiratory correlation signal as the priori knowledge. The organ motion estimation model is constructed by using the priori velocity vector field and the priori-tumor position data set as the priori knowledge. In the process of performing the operation on the patient having the tumor, the estimated tumor position is obtained first by inputting the respiratory correlation signal of the patient as the proxy signal into the tumor motion estimation model; then, the estimated velocity vector field of the whole organ is obtained by inputting the estimated tumor position into the organ motion estimation model. Therefore, it is possible to estimate the respiratory motion of the whole organ and improve the accuracy of positioning the tumor and the vital anatomical structures around the tumor.

Figure 2:
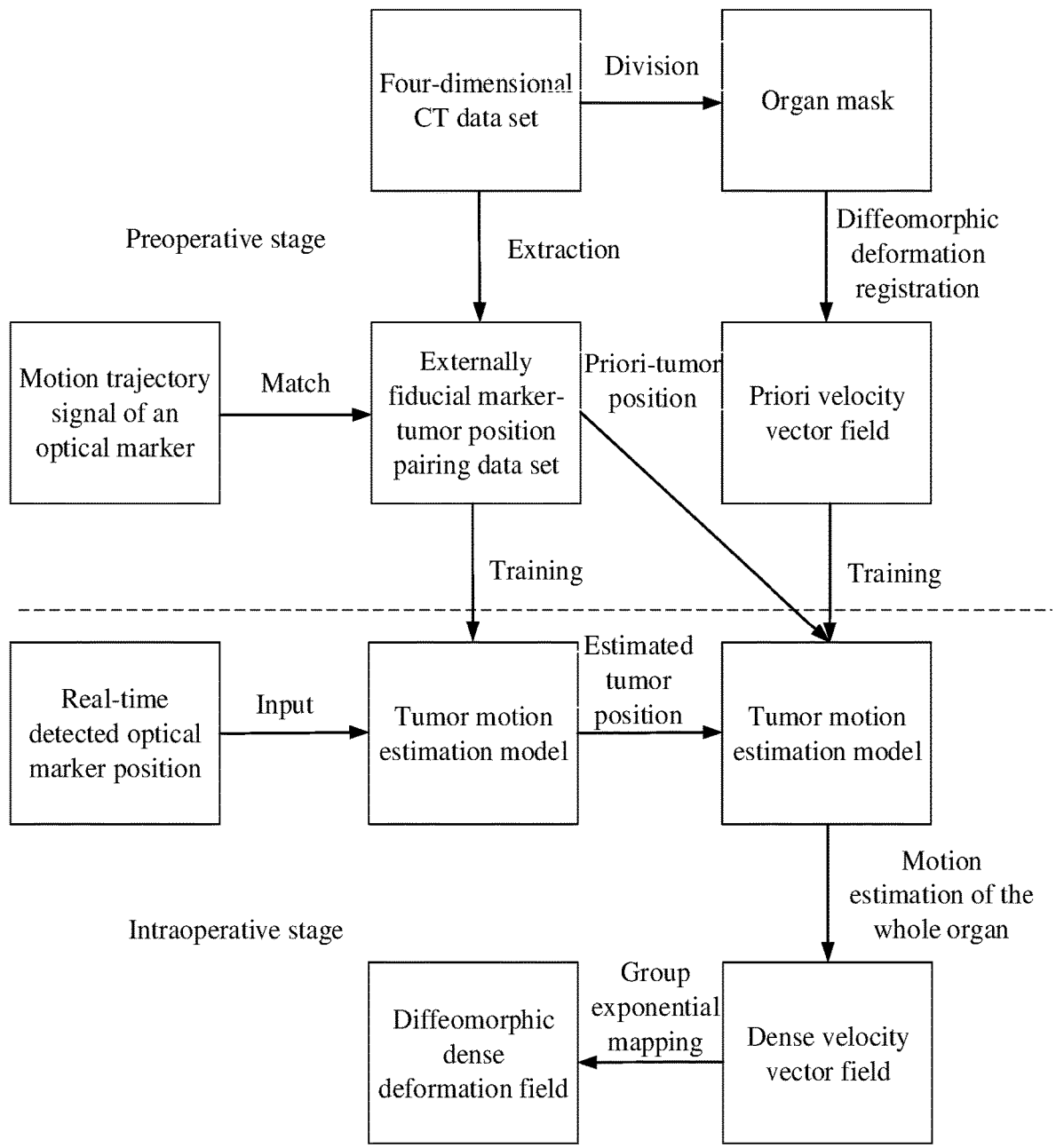
FIG. 2 is a schematic diagram of an operation principle of a motion estimation method for a tumor according to an embodiment of the present disclosure.

FIG. 2 is a schematic diagram of an operation principle of a motion estimation method for a tumor according to an embodiment of the present disclosure. The motion estimation method may be divided into two stages: a preoperative stage and an intraoperative stage.

In the preoperative stage, a four-dimensional CT image data set of the patient is obtained and the image data set includes the three-dimensional CT image of the designated organ of the patient in each of different respiratory states. On the one hand, the body data (organ masks) of the designated organ is obtained by dividing the image data set, and the velocity vector field (i.e., the priori velocity vector field) corresponding to each of different respiratory states is obtained by performing diffeomorphic deformation-registration processing based on the body data. On the other hand, an externally fiducial marker-tumor position pairing data set corresponding to each of different respiratory states is obtained by means of phase matching based on the tumor position (i.e., the priori-tumor position data set) extracted from the CT image data set and a motion trajectory signal of a pre-collected optical marker (the optical marker may be adhered to the skin surface of the chest and abdomen part of the patient). Furthermore, a tumor motion estimation model is obtained by training based on the externally fiducial marker-tumor position pairing data set. In addition, an organ motion estimation model is obtained by training based on the priori velocity vector field and the priori-tumor position data set.

In the intraoperative stage, the estimated tumor position is obtained by detecting a motion signal of an optical marker on body surface in real time and inputting the current position of the optical marker into the tumor motion estimation model constructed before the operation. Subsequently, a corresponding dense velocity vector field is obtained by inputting the estimated tumor position into the organ motion estimation model constructed before the operation to estimate the respiratory motion of the whole organ. Finally, a corresponding diffeomorphic dense deformation field (i.e., a displacement vector field) is obtained by performing group exponential processing on the dense velocity vector field, thereby reconstructing the motion morphology of the organ in real time and realizing the hierarchical motion estimation.

In general, it is possible to achieve a more precise estimation on the tumor on the basis of realizing an accurate motion estimation of the whole organ in the hierarchical estimation architecture for the motion from the tumor to the whole organ under the free respiratory motion according to the present disclosure. Moreover, an estimation of the respiratory motion of the whole organ in operation does not require iterative optimization calculations, thus having better real-time processing performance. In addition, the dense deformation field of the whole organ estimated by using the organ motion estimation model is diffeomorphic, i.e., has the advantages of being—globally one-to-one, differentiable, and reversible.

It should also be understood that numerical values of sequence numbers of the above steps do not mean an execution order and should not construed to any limitation to an implementation process of the embodiments of the present disclosure, and the execution order of processes should be determined by their functions and internal logics.

A motion estimation method for a tumor is mainly described above, and a motion estimation apparatus for a tumor is described below.

Figure 3:
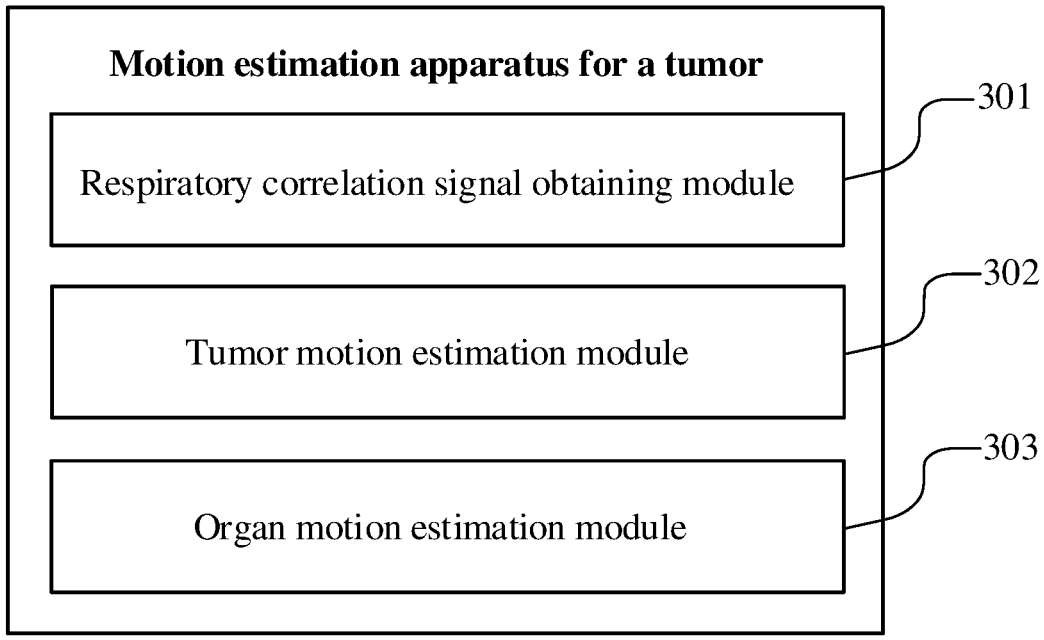
FIG. 3 is a structural diagram of a motion estimation apparatus for a tumor according to an embodiment of the present disclosure.

FIG. 3 shows an embodiment of a motion estimation apparatus for a tumor according to an embodiment of the present disclosure. In this embodiment, the apparatus includes a respiratory correlation signal obtaining module 301, a tumor motion estimation module 302, and an organ motion estimation module 303.

The respiratory correlation signal obtaining module 301 is configured to obtain a current value of a respiratory correlation signal of a patient. The respiratory correlation signal reflects a motion trajectory feature of a designated organ with the tumor of the patient in each of different respiratory states.

The tumor motion estimation module 302 is configured to input the current value of the respiratory correlation signal into a tumor motion estimation model to obtain an estimated current position of the tumor. The tumor motion estimation model is constructed by taking a priori-tumor position data set and the respiratory correlation signal as priori knowledge. The priori-tumor position data set is determined based on a pre-collected image data set of the designated organ and includes a position of the tumor in each of different respiratory states. The image data set includes a three-dimensional image of the designated organ in each of different respiratory states.

The organ motion estimation module 303 is configured to input the estimated current position of the tumor into an organ motion estimation model to obtain an estimated current velocity vector field of the designated organ. The current velocity vector field includes a velocity vector corresponding to each position point of the designated organ. The organ motion estimation model is constructed by using a priori velocity vector field and the priori-tumor position data set as the priori knowledge. The priori velocity vector field is determined based on the image data set and includes a velocity vector field of the designated organ in each of different respiratory states.

In an embodiment of the present disclosure, the respiratory correlation signal is a motion trajectory signal of an optical marker disposed at a specified part of a body of the patient. The motion trajectory signal includes a spatial position of the optical marker at each time point. The motion estimation apparatus further includes a pairing data set construction module and a tumor-motion estimation model construction module.

The pairing data set construction module is configured to construct a position pairing data set based on the priori-tumor position data set and the motion trajectory signal. The position pairing data set includes a tumor position in the priori-tumor position data set and an optical marker position in the motion trajectory signal that respectively correspond to each of the respiratory states.

The tumor-motion estimation model construction module is configured to construct the tumor motion estimation model by using the position pairing data set as the priori knowledge.

Further, the tumor-motion estimation model construction module may be specifically configured to establish a corresponding tumor motion estimation model in each predetermined space coordinate direction by using the motion trajectory signal as a proxy signal based on a ε-SVR machine learning model and the position pairing data set.

In an embodiment of the present disclosure, the motion estimation apparatus may further include a body data obtaining module, a diffeomorphic deformation-registration module, and an organ-motion estimation model construction module.

The body data obtaining module is configured to obtain body data of the designated organ in each of different respiratory states by dividing the image data set.

The diffeomorphic deformation-registration module is configured to select one respiratory state from the different respiratory states as a reference state, and performing diffeomorphic deformation-registration processing on body data in the reference state and body data in other states to obtain the priori velocity vector field. The other states are other respiratory states except the reference state among the different respiratory states.

The organ-motion estimation model construction module is configured to construct the organ motion estimation model by using the priori velocity vector field and the priori-tumor position data set as the priori knowledge.

Further, the diffeomorphic deformation-registration module may include a velocity vector field assignment unit and a velocity vector field updating unit.

The velocity vector field assignment unit is configured to assign a predetermined initial value to a velocity vector field of the designated organ in the reference state.

The velocity vector field updating unit is configured to calculate, for each respiratory state in the other states, an update value of a velocity vector field corresponding to the respiratory state by using an alternately optimized strategy based on body data in the respiratory state and the body data in the reference state, and adding the update value to the initial value to obtain a velocity vector field of the designated organ in the respiratory state.

In an embodiment of the present disclosure, the organ-motion estimation module may include a spatial interpolation unit.

The spatial interpolation unit is configured to obtain, for each position point of the designated organ, an estimated current velocity vector of the position point by using a velocity vector of the position point as a function of the estimated current position of the tumor and performing an interpolation between velocity vectors of the position point in each of the different respiratory states by means of spatial interpolation based on the estimated current position of the tumor. The velocity vector of the position point in each of the different respiratory states is determined based on the priori velocity vector field.

In an embodiment of the present disclosure, the motion estimation apparatus may further include a group exponential transformation module.

The group exponential transformation module is configured to perform regularization on the current velocity vector field by using a predetermined Gaussian kernel function and obtaining a current dense displacement field of the designated organ by means of group exponential transformation. The current dense displacement field includes a current displacement vector corresponding to each position point of the designated organ.

According to an embodiment of the present disclosure, a computer-readable storage medium is further provided. The computer-readable storage medium has a computer program stored thereon. The computer program, when executed by the processor, implements any one of the motion estimation methods for the tumor as illustrated in FIG. 1.

According to an embodiment of the present disclosure, a computer program product is further provided. The computer program product, when executed by a terminal device, causes the terminal device to implement the any one of the motion estimation methods for the tumor as illustrated in FIG. 1.

Figure 4:
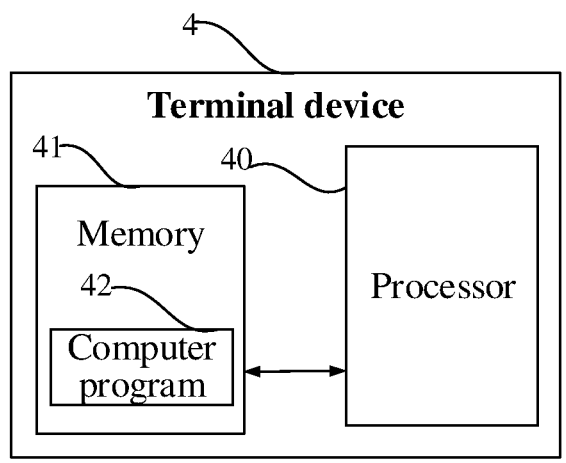
FIG. 4 is a schematic diagram of a terminal device according to an embodiment of the present disclosure.

FIG. 4 is a schematic diagram of a terminal device according to an embodiment of the present disclosure. As illustrated in FIG. 4, the terminal device 4 in this embodiment includes: a processor 40, a memory 41, and a computer program 42 stored on the memory 41 and executable on the processor 40. The processor 40, when executing the computer program 42, implements the steps in the embodiments of the motion estimation method for the tumor, e.g., step 101 to step 103 illustrated in FIG. 1. Alternatively, the processor 40, when executing the computer program 42, implements the functions of each module/unit in the above apparatus embodiments, e.g., functions of the modules 301 to 303 illustrated in FIG. 3.

The computer program 42 may be divided into one or more modules/units. The one or more modules/units may be stored on the memory 41 and executed by the processor 40 to complete the present disclosure. The one or more modules/units may be a series of computer program instruction segments capable of implementing specific functions. The instruction segments are used to describe an execution process of the computer program 42 in the terminal device 4.

The above processor 40 may be a Central Processing Unit (CPU), another general-purpose processor, a Digital Signal Processor (DSP), an Application Specific Integrated Circuit (ASIC), a Field-Programmable Gate Array (FPGA) or another programmable logic device, a discrete gate or transistor logic device, or a discrete hardware component. The general purpose processor may be a microprocessor or the processor may be any conventional processor.

The memory 41 may be an internal storage unit of the terminal device 4, for example, a hard disk or a memory of the terminal device 4. The memory 41 may also be an external storage device of the terminal device 4, for example, a plug-in hard disk, a Smart Media Card (SMC), a Secure Digital (SD) card, a Flash Card, and the like provided on the terminal device 4. Further, the memory 41 may further include both an internal storage unit and an external storage device of the terminal device 4. The memory 41 stores the computer program and other programs and data required by the terminal device. The memory 41 may temporarily store data that has been outputted or to be outputted.

Those skilled in the art can clearly understand that, for convenience and conciseness of description, the divisions of the above functional units and modules are merely illustrative. In practical applications, the above functions can be allocated to different functional units and modules for implementation as required. That is, an internal structure of the above apparatus is divided into different functional units or modules to complete all or part of the functions described above. The functional units and modules in the embodiments may be integrated into one processing unit, or each unit may exist physically alone, or two or more units may be integrated into one unit. The integrated unit can be implemented in a form of hardware, or in a form of a software functional unit. In addition, specific names of the functional units and modules are only for the convenience of distinguishing one from another, and are not used to limit the scope of the present disclosure. For a specific working process of the units and modules in the above system, reference may be made to a corresponding process in the above method embodiments, and details thereof will not be repeated herein.

Those skilled in the art can clearly understand that, for convenience and conciseness of description, for a specific working process of the units and modules in the above system, reference may be made to a corresponding process in the above method embodiments, and details thereof will not be repeated herein.

In above embodiments, description of respective embodiments emphasizes different aspects, and for parts that are not detailed or described in some embodiments, reference may be made to relevant description of other embodiments.

Those skilled in the art could be aware that, exemplary units and algorithm steps described in combination with embodiments disclosed herein may be implemented by electronic hardware or in a combination of computer software and electronic hardware. Whether these functions are executed by hardware or software depends upon the specific use and design constraints of the technical solutions. Those skilled in the art may adopt different methods for different specific applications to implement described functions, which should not be regarded as going beyond the scope of the present disclosure.

In the embodiments provided by the present disclosure, it should be understood that, the disclosed apparatus and method may be implemented in other ways. For example, the system embodiments described above are merely illustrative. For example, the modules or units are merely divided based on the logic functions, and they can be divided in other ways in actual implementations. For example, a plurality of units or components may be combined or may be integrated into another system, or some features may be omitted or not executed. In addition, the mutual coupling or direct coupling or communication connection between these units illustrated or discussed above may be via some interfaces, or the indirect coupling or communication connection between devices or units, which may be in an electrical, mechanical, or other manners.

The units described as separate parts may or may not be physically separated. Parts illustrated as units may or may not be physical units, i.e., the parts may be located in one place, or may be distributed on a plurality of network units. Some or all of the units can be selected according to actual needs to achieve objects of the solutions of the embodiments.

In addition, respective functional units in respective embodiments of the present disclosure may be integrated in one processing unit, or the respective units may be separate physical existence, or two or more units may be integrated in one unit. The above integrated units can be implemented in a form of hardware, or in a form of a software functional unit.

If the integrated units are realized in a form of software functional units and are sold or used as separate products, the integrated units can be stored in a computer-readable storage medium. Based on this understanding, all or part of the processes in the above method embodiments of the present disclosure may also be implemented by relevant hardware instructed by a computer program. The computer program can be stored in a computer-readable storage medium. When the computer program is executed by the processor, steps of the above method embodiments may be implemented. The computer program may include computer program codes. The computer program codes may be in a form of source codes, object codes, an executable file, or some intermediate forms, etc. The computer-readable medium may include any entity or device capable of carrying the computer program codes, a recording medium, a USB disk, a mobile hard disk, a magnetic disk, an optical disk, a computer memory, a Read-Only Memory (ROM), a Random Access Memory (RAM), an electric carrier signal, a telecommunications signal, and a software distribution medium, etc. It should be noted that content contained in the computer-readable medium can be appropriately added or deleted in accordance with requirements of legislation and patent practices in respective judicial districts. For example, in some judicial districts, according to the legislation and patent practices, the computer-readable medium excludes electrical carrier signals and telecommunication signals.

As mentioned above, the above embodiments are only used to illustrate, rather than to limit, the technical solutions of the present disclosure. Although the present disclosure is described in detail with reference to the above embodiments, those skilled in the art should understand that modifications may be made to the technical solutions described in the above embodiments, or equivalent replacements may be made to some of the technical features of the technical solutions described in the above embodiments. However, these modifications or replacements do not cause a deviation of the essence of corresponding technical solutions from the spirit and scope of the technical solutions of the embodiments of the present disclosure, and shall be contained in the scope of the present disclosure.

What is claimed is:

1. A motion estimation method for a tumor, performed by a terminal device, comprising:
    obtaining a current value of a respiratory correlation signal of a patient, wherein the respiratory correlation signal is obtained by collecting a motion trajectory of an optical marker disposed at a specified part of a body of the patient using an optical tracking capture device, the current value of the respiratory correlation signal being indicative of a spatial position where the optical marker is currently located, and wherein the respiratory correlation signal reflects a motion trajectory feature of a designated organ with the tumor of the patient in each of different respiratory states;
    processing the current value of the respiratory correlation signal based on a tumor motion estimation model to obtain an estimated current position of the tumor, the tumor motion estimation model being a machine learning model constructed by using a priori-tumor position data set and the respiratory correlation signal as priori knowledge, the priori-tumor position data set being determined based on a pre-collected image data set of the designated organ and comprising a position of the tumor in each of different respiratory states, and the image data set comprising a three-dimensional image of the designated organ in each of different respiratory states;
    inputting the estimated current position of the tumor into an organ motion estimation model to obtain an estimated current velocity vector field of the designated organ, the current velocity vector field comprising a velocity vector corresponding to each position point of the designated organ, the organ motion estimation model being constructed by using a priori velocity vector field and the priori-tumor position data set as the priori knowledge, and the priori velocity vector field being determined based on the image data set and comprising a velocity vector field of the designated organ in each of different respiratory states; and
    performing regularization on the current velocity vector field by using a predetermined Gaussian kernel function and obtaining a current dense displacement field of the designated organ by means of group exponential transformation, to enable real-time reconstruction of motion morphology of the designated organ for real-time guidance in a percutaneous image-guided interventional procedure, the current dense displacement field comprising a current displacement vector corresponding to each position point of the designated organ.

2. The method according to claim 1, wherein the respiratory correlation signal is a motion trajectory signal of the optical marker, the motion trajectory signal comprises a spatial position of the optical marker at each time point, and the method further comprises, prior to inputting the current value of the respiratory correlation signal into the tumor motion estimation model:
    constructing a position pairing data set based on the priori-tumor position data set and the motion trajectory signal, the position pairing data set comprising a tumor position in the priori-tumor position data set and an optical marker position in the motion trajectory signal that respectively correspond to each of the respiratory states; and
    constructing the tumor motion estimation model by using the position pairing data set as the priori knowledge.

3. The method according to claim 2, wherein said constructing the tumor motion estimation model by using the position pairing data set as the priori knowledge comprises:
    establishing a corresponding tumor motion estimation model in each predetermined space coordinate direction by using the motion trajectory signal as a proxy signal based on a ε-SVR machine learning model and the position pairing data set.

4. The method according to claim 1, further comprising, prior to said inputting the current value of the respiratory correlation signal into the tumor motion estimation model:
obtaining body data of the designated organ in each of different respiratory states by dividing the image data set;
selecting one of respiratory states from the different respiratory states as a reference state, and performing diffeomorphic deformation-registration processing on body data in the reference state and body data in other states to obtain the priori velocity vector field, the other states being other respiratory states except the reference state among the different respiratory states; and
constructing the organ motion estimation model by using the priori velocity vector field and the priori-tumor position data set as the priori knowledge.

5. The method according to claim 4, wherein said performing the diffeomorphic deformation-registration processing on the body data in the reference state and the body data in the other states to obtain the priori velocity vector field comprises:
assigning a predetermined initial value to a velocity vector field of the designated organ in the reference state; and
calculating, for each of the respiratory states in the other states, an update value of a velocity vector field corresponding to the respiratory state by using an alternately optimized strategy based on body data in the respiratory state and the body data in the reference state, and adding the update value to the initial value to obtain a velocity vector field of the designated organ in the respiratory state.

6. The method according to claim 1, wherein said inputting the estimated current position of the tumor into the organ motion estimation model to obtain the estimated current velocity vector field of the designated organ comprises:
obtaining, for each position point of the designated organ, an estimated current velocity vector of the position point by using a velocity vector of the position point as a function of the estimated current position of the tumor and performing an interpolation between velocity vectors of the position point in each of the different respiratory states by means of spatial interpolation based on the estimated current position of the tumor, wherein the velocity vector of the position point in each of the different respiratory states is determined based on the priori velocity vector field.

7. A terminal device, comprising a memory, a processor, and a computer program stored in the memory and executable on the processor, wherein the processor, when executing the computer program, implements:
obtaining a current value of a respiratory correlation signal of a patient, wherein the respiratory correlation signal is obtained by collecting a motion trajectory of an optical marker disposed at a specified part of a body of the patient using an optical tracking capture device, the current value of the respiratory correlation signal being indicative of a spatial position where the optical marker is currently located, and wherein the respiratory correlation signal reflects a motion trajectory feature of a designated organ with the tumor of the patient in each of different respiratory states;
processing the current value of the respiratory correlation signal based on a tumor motion estimation model to obtain an estimated current position of the tumor, the tumor motion estimation model being a machine learning model constructed by using a priori-tumor position data set and the respiratory correlation signal as priori knowledge, the priori-tumor position data set being determined based on a pre-collected image data set of the designated organ and comprising a position of the tumor in each of different respiratory states, and the image data set comprising a three-dimensional image of the designated organ in each of different respiratory states;
inputting the estimated current position of the tumor into an organ motion estimation model to obtain an estimated current velocity vector field of the designated organ, the current velocity vector field comprising a velocity vector corresponding to each position point of the designated organ, the organ motion estimation model being constructed by using a priori velocity vector field and the priori-tumor position data set as the priori knowledge, and the priori velocity vector field being determined based on the image data set and comprising a velocity vector field of the designated organ in each of different respiratory states; and
performing regularization on the current velocity vector field by using a predetermined Gaussian kernel function and obtaining a current dense displacement field of the designated organ by means of group exponential transformation, to enable real-time reconstruction of motion morphology of the designated organ for real-time guidance in a percutaneous image-guided interventional procedure, the current dense displacement field comprising a current displacement vector corresponding to each position point of the designated organ.

8. The terminal device according to claim 7, wherein the respiratory correlation signal is a motion trajectory signal of the optical marker, the motion trajectory signal comprises a spatial position of the optical marker at each time point, and the processor, when executing the computer program, further implements, prior to inputting the current value of the respiratory correlation signal into the tumor motion estimation model:
constructing a position pairing data set based on the priori-tumor position data set and the motion trajectory signal, the position pairing data set comprising a tumor position in the priori-tumor position data set and an optical marker position in the motion trajectory signal that respectively correspond to each of the respiratory states; and
constructing the tumor motion estimation model by using the position pairing data set as the priori knowledge.

9. The terminal device according to claim 8, wherein said constructing the tumor motion estimation model by using the position pairing data set as the priori knowledge comprises:
establishing a corresponding tumor motion estimation model in each predetermined space coordinate direction by using the motion trajectory signal as a proxy signal based on a ε-SVR machine learning model and the position pairing data set.

10. The terminal device according to claim 7, wherein the processor, when executing the computer program, further implements, prior to said inputting the current value of the respiratory correlation signal into the tumor motion estimation model:
obtaining body data of the designated organ in each of different respiratory states by dividing the image data set;

selecting one of respiratory states from the different respiratory states as a reference state, and performing diffeomorphic deformation-registration processing on body data in the reference state and body data in other states to obtain the priori velocity vector field, the other states being other respiratory states except the reference state among the different respiratory states; and constructing the organ motion estimation model by using the priori velocity vector field and the priori-tumor position data set as the priori knowledge.

11. The terminal device according to claim 10, wherein said performing the diffeomorphic deformation-registration processing on the body data in the reference state and the body data in the other states to obtain the priori velocity vector field comprises:

assigning a predetermined initial value to a velocity vector field of the designated organ in the reference state; and calculating, for each of the respiratory states in the other states, an update value of a velocity vector field corresponding to the respiratory state by using an alternately optimized strategy based on body data in the respiratory state and the body data in the reference state, and adding the update value to the initial value to obtain a velocity vector field of the designated organ in the respiratory state.

12. The terminal device according to claim 7, wherein said inputting the estimated current position of the tumor into the organ motion estimation model to obtain the estimated current velocity vector field of the designated organ comprises:

obtaining, for each position point of the designated organ, an estimated current velocity vector of the position point by using a velocity vector of the position point as a function of the estimated current position of the tumor and performing an interpolation between velocity vectors of the position point in each of the different respiratory states by means of spatial interpolation based on the estimated current position of the tumor, wherein the velocity vector of the position point in each of the different respiratory states is determined based on the priori velocity vector field.

13. A non-transitory computer-readable storage medium, having a computer program stored thereon, wherein the computer program, when executed by the processor, implements:

obtaining a current value of a respiratory correlation signal of a patient, wherein the respiratory correlation signal is obtained by collecting a motion trajectory of an optical marker disposed at a specified part of a body of the patient using an optical tracking capture device, the current value of the respiratory correlation signal being indicative of a spatial position where the optical marker is currently located, and wherein the respiratory correlation signal reflects a motion trajectory feature of a designated organ with the tumor of the patient in each of different respiratory states;

processing the current value of the respiratory correlation signal based on a tumor motion estimation model to obtain an estimated current position of the tumor, the tumor motion estimation model being a machine learning model constructed by using a priori-tumor position data set and the respiratory correlation signal as priori knowledge, the priori-tumor position data set being determined based on a pre-collected image data set of the designated organ and comprising a position of the tumor in each of different respiratory states, and the image data set comprising a three-dimensional image of the designated organ in each of different respiratory states;

inputting the estimated current position of the tumor into an organ motion estimation model to obtain an estimated current velocity vector field of the designated organ, the current velocity vector field comprising a velocity vector corresponding to each position point of the designated organ, the organ motion estimation model being constructed by using a priori velocity vector field and the priori-tumor position data set as the priori knowledge, and the priori velocity vector field being determined based on the image data set and comprising a velocity vector field of the designated organ in each of different respiratory states; and performing regularization on the current velocity vector field by using a predetermined Gaussian kernel function and obtaining a current dense displacement field of the designated organ by means of group exponential transformation, to enable real-time reconstruction of motion morphology of the designated organ for real-time guidance in a percutaneous image-guided interventional procedure, the current dense displacement field comprising a current displacement vector corresponding to each position point of the designated organ.

14. The non-transitory computer-readable storage medium according to claim 13, wherein the respiratory correlation signal is a motion trajectory signal of the optical marker, the motion trajectory signal comprises a spatial position of the optical marker at each time point, and the computer program, when executed by the processor, further implements, prior to inputting the current value of the respiratory correlation signal into the tumor motion estimation model:

constructing a position pairing data set based on the priori-tumor position data set and the motion trajectory signal, the position pairing data set comprising a tumor position in the priori-tumor position data set and an optical marker position in the motion trajectory signal that respectively correspond to each of the respiratory states; and constructing the tumor motion estimation model by using the position pairing data set as the priori knowledge.

15. The non-transitory computer-readable storage medium according to claim 14, wherein said constructing the tumor motion estimation model by using the position pairing data set as the priori knowledge comprises:

establishing a corresponding tumor motion estimation model in each predetermined space coordinate direction by using the motion trajectory signal as a proxy signal based on a $\varepsilon$-SVR machine learning model and the position pairing data set.

16. The non-transitory computer-readable storage medium according to claim 13, wherein the computer program, when executed by the processor, further implements, prior to said inputting the current value of the respiratory correlation signal into the tumor motion estimation model:

obtaining body data of the designated organ in each of different respiratory states by dividing the image data set;

selecting one of respiratory states from the different respiratory states as a reference state, and performing diffeomorphic deformation-registration processing on body data in the reference state and body data in other states to obtain the priori velocity vector field, the other states being other respiratory states except the reference state among the different respiratory states; and constructing the organ motion estimation model by using the priori velocity vector field and the priori-tumor position data set as the priori knowledge.

17. The non-transitory computer-readable storage medium according to claim 16, wherein said performing the diffeomorphic deformation-registration processing on the body data in the reference state and the body data in the other states to obtain the priori velocity vector field comprises:
assigning a predetermined initial value to a velocity vector field of the designated organ in the reference state; and
calculating, for each of the respiratory states in the other states, an update value of a velocity vector field corresponding to the respiratory state by using an alternately optimized strategy based on body data in the respiratory state and the body data in the reference state, and adding the update value to the initial value to obtain a velocity vector field of the designated organ in the respiratory state.

18. The non-transitory computer-readable storage medium according to claim 13, wherein said inputting the estimated current position of the tumor into the organ motion estimation model to obtain the estimated current velocity vector field of the designated organ comprises:
obtaining, for each position point of the designated organ, an estimated current velocity vector of the position point by using a velocity vector of the position point as a function of the estimated current position of the tumor and performing an interpolation between velocity vectors of the position point in each of the different respiratory states by means of spatial interpolation based on the estimated current position of the tumor, wherein the velocity vector of the position point in each of the different respiratory states is determined based on the priori velocity vector field.

* * * * *